Oct. 28, 1930.   G. A. JULIUS ET AL   1,779,774
MEANS FOR CALCULATING THE RATIO OF VARIABLE QUANTITIES
Filed May 7, 1929    2 Sheets-Sheet 1
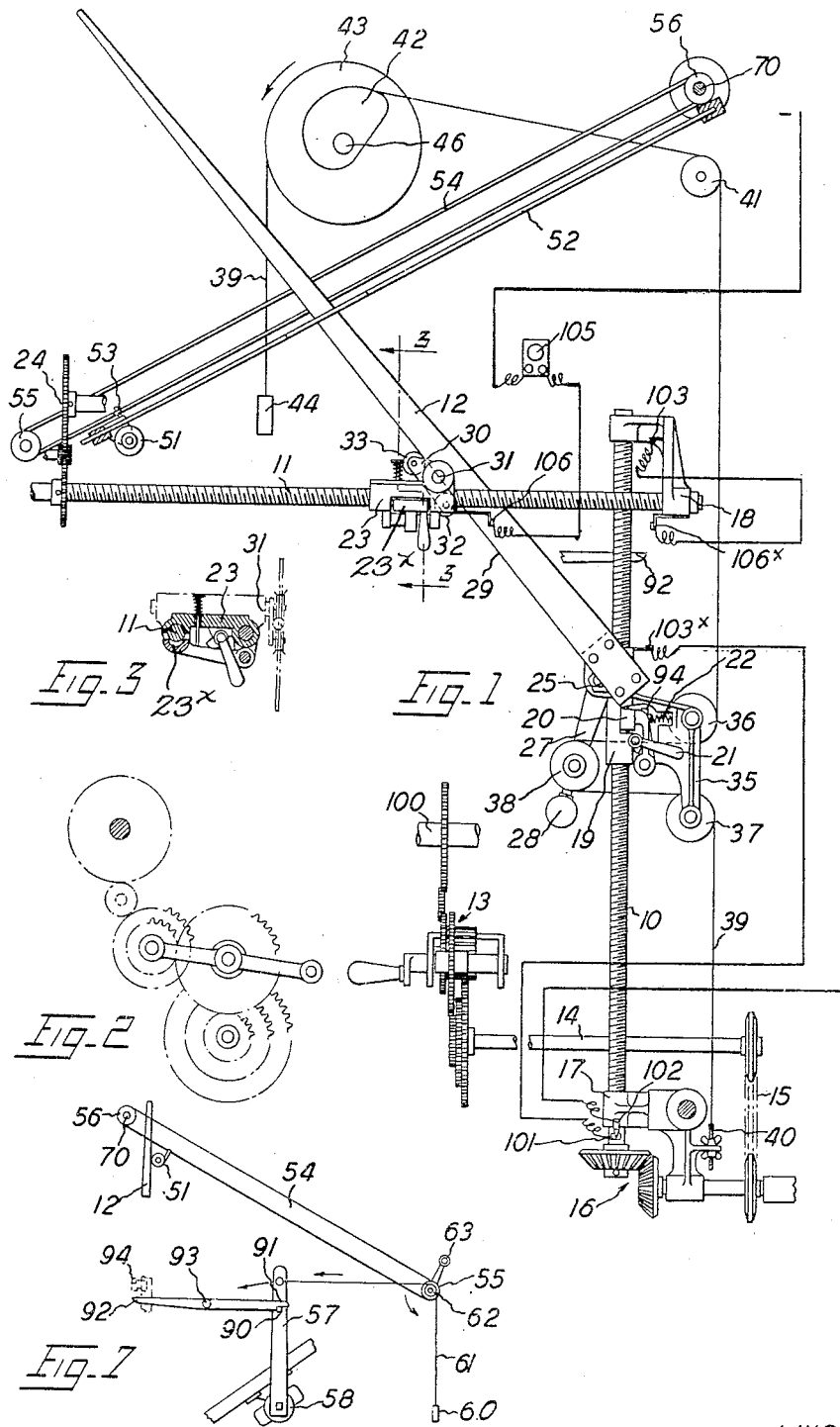
INVENTORS:
G. A. Julius &
A. F. Julius
By: Marks & Clark
    Attys.

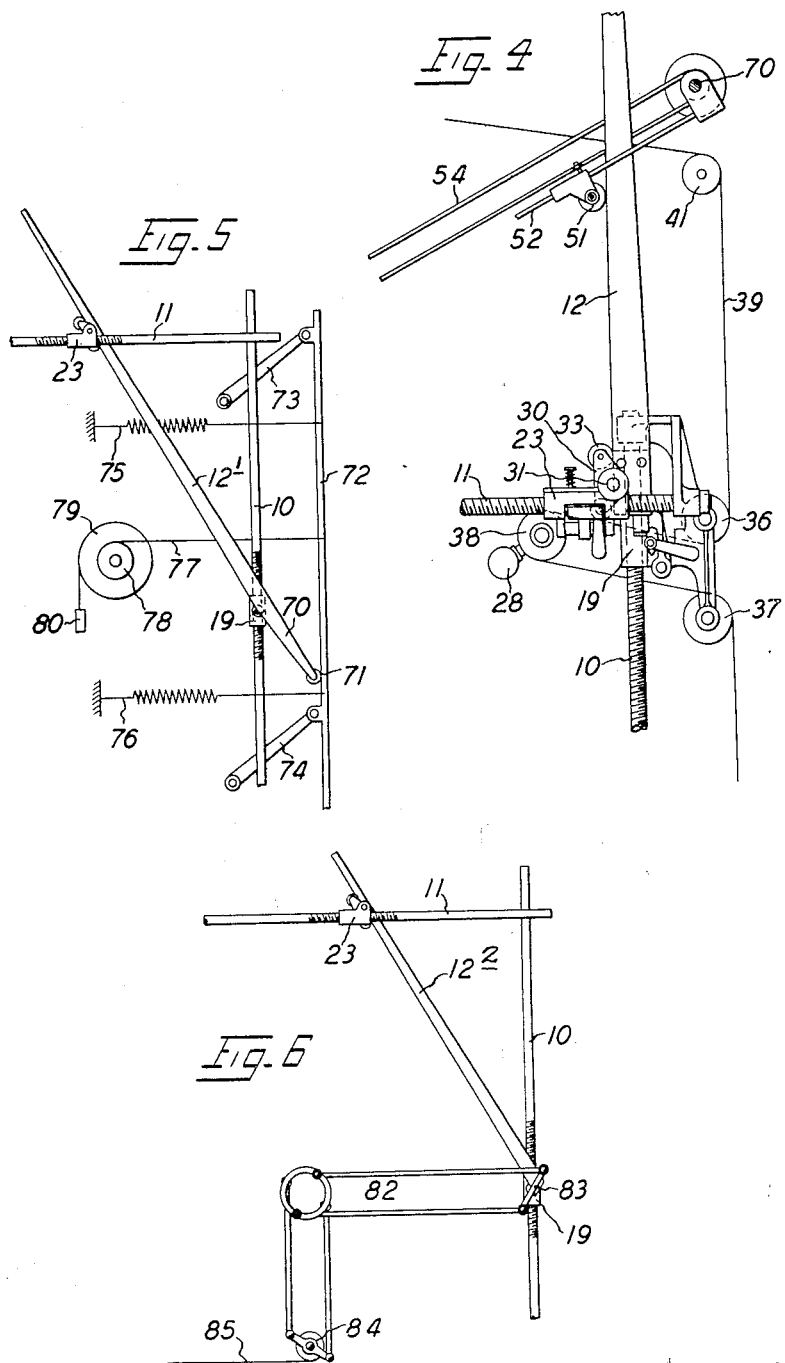

Patented Oct. 28, 1930

1,779,774

UNITED STATES PATENT OFFICE

GEORGE ALFRED JULIUS AND AWDRY FRANCIS JULIUS, OF SYDNEY, NEW SOUTH WALES, AUSTRALIA

MEANS FOR CALCULATING THE RATIO OF VARIABLE QUANTITIES

Application filed May 7, 1929, Serial No. 361,240, and in Australia January 29, 1929.

This invention relates to means and apparatus for automatically calculating and indicating progressively and continuously the ratio of two varying quantities or values, for example, steam used in relation to horse power output in a power plant, or sales in departments of a store as compared with the total sales of the store. In the latter case, one unit would be allocated to register the sales in each department and the indicator of each individual unit would display progressively and continuously the ratio between the respective department sales and the total sales of all the departments.

The invention has special utility in connection with betting totalizators. It is associated with these machines for the purpose of indicating to the public continuously during the operation of the totalizator the "odds" which would be payable on each horse if the race were run at the moment at which the figures are read by the observer.

The mechanism is intergeared with or is synchronously controlled by the mechanisms which actuate the individual total counters and the grand total counter, and the ratios between the grand total record (less any predetermined deduction) and the several individual totals (which ratios vary from moment to moment), are indicated simultaneously on the individual indicator dials.

In practice the sought-for ratio is obtained by the operation of a mechanical device which is represented in the specific mechanism described below.

In the accompanying drawings:—

Fig. 1 is a side elevational view of mechanical apparatus embodying the invention;

Figs. 2 and 3 details of change gearing, and a lead screw clasp nut, which are shown also in Fig. 1;

Fig. 4 is a partial side elevational view showing the parts which are displayed in Fig. 1 as they appear at the commencement of movement of the apparatus whilst the two figures or quantities, the ratios of which are to be indicated, are at infinity or zero;

Figs. 5 and 6 are semi-diagrammatic views showing other alternative devices for the transmission of the movements to an indicator; and Fig. 7 is a diagrammatic view of a device for stabilizing the quotient arm when it is at or near the zero (vertical) position.

10 is a lead screw which is driven directly from or in synchronism with a counter or indicator on which the grand total or arithmetical dividend number is registered. 11 is a lead screw which is similarly driven from the indicator or counter which registers the divisor number. Thus, in the case of a totalizator, the lead screw 10 will be driven from the grand total wheel or shaft of the totalizator and the lead screw 11 from a horse total wheel or shaft of the totalizator. The problem to which the invention is addressed is to provide a device for indicating the ratio between the "dividend" figure and the "divisor" figure while either or both those figures are progressively changing so as to represent the quotient for the time being as a simple fraction. 12 is the quotient arm; it is caused to take an angular position according to the relative rotational movements of the lead screws 10 and 11, and its angular movement is transmitted and applied mechanically to a direct reading dial or other convenient form of indicator. The rotary dial is a most convenient form of indicator, but obviously a linear type of indicator might be used instead of a dial. Intermediate between the dividend lead screw 10 and the grand total wheel or shaft 100 from which the dividend lead screws 10 are driven, gearing is introduced; similar gearing may be introduced in the drive to the divisor lead screw 11; this gearing 13 is of the change wheel type such as is commonly used in lathes, and its purpose is to reduce the rotations of the lead screw with which it is associated in relation to the rotations of the driving element, to provide appropriately for any deductions which are required to be made from the dividend before it is split up into quotients, or to provide for variation in the divisor value. In totalizator practice, certain percentages are taken from the total investment to cover operating expenses, commission, taxes, and the like. Thus, for instance, if the total of these deductions amount to 12½% of the invested total, the change gearing 13, which is shown in side elevation in Fig. 2, is proportioned to cause the shaft 10 to turn 87½ times for each 100 turns of the driving element. If at any time the deduction percentage is required to be altered or if the dial is required to indicate a split quotient, for "place" betting, it is necessary only to alter the ratio of the drive by readjustment or substitution of wheels in the change gearing 13 in the manner well known to turners. 14 is an intermediate shaft and 15 a chain or other positive drive mechanism, and 16 a bevel wheel transmission intermediate the change gear 13 and the dividend lead screw 10. The lead screws 10 and 11 are rotatably supported in bearings 17 and 18 which are carried on some fixed members.

The divisor lead screw 11 is driven from the total shaft or total wheel of the horse total indicator or equivalent element. One of the devices shown in the drawings must be associated with each horse total mechanism in a totalizator equipment, because it is necessary to show for each and every horse in the race what odds are offered by the totalizator machine on each particular horse at any moment during the progress of the betting. Obviously, each one of these ratio finding equipments operate independently of all the others in the system, though the major lead screws 10 in all of them are driven from one shaft which gets motion from the grand total register. Their independence is essential because the investor is concerned in any reading of a dial only with the odds offered on one individual horse to which that dial relates, and he ascertains by observation of the dials for each and all of the horses separately what odds is available at any particular moment on each particular horse. The ratio which determines the odds for each horse is ascertained from the angular position of the quotient arm 12 in the unit relating to that horse.

The lead screw nut 20 in the carriage 19 works on the lead screw 10. The jaw of this nut 20 is locked and unlocked as required by a hand piece 21 and the jaw is normally held closed by a spring 22. Any detail of construction such as used in any type of lathe for engaging the carriage to the lead screw may be used at this position. A similar lead screw carriage 23 and nut 23ˣ works on the shaft 11. Fig. 3 shows the detail of a satisfactory arrangement for this purpose; this figure being a section on the plane 3—3 Fig. 1. The quotient arm 12 is pivotally carried at or near the bottom end of it on the nut carriage 19 and one side of the quotient arm bears against a support 30 which is fixed on the lead nut carriage 23. The angular position of the quotient arm 12 will vary according to the relative positions of the carriages 19 and 23 on the lead screws 10 and 11 respectively.

The lead screws 10 and 11 are disposed at an angle to each other, preferably a right angle, but not necessarily so. The lead screw 11 is driven through a gear train 24 or by any other convenient transmission, including when necessary a variable change gear. The pivot 25 on which the quotient arm 12 is carried moves parallel with the lead screw 10. 27 is a counter-weighted arm on the tail of the quotient arm, below its pivot mounting 25, 28 being a counterweight. The object of this counterweight is to cause the quotient arm 12 to bear downwardly against the support which is carried by the carriage 23. The bearing of this support is taken on the inner edge 29 of the quotient arm; the support consists of a rocking frame 30 carried on a pivot 31 and fitted with two rollers 32 and 33. The tangent from the faces of these wheels 32—33 represented by the inner edge 29 of the quotient arm 12 passes through the centre of the pivot 31 in all positions of the quotient arm. The counterweight 28 operates to swing the quotient arm 12 towards the carriage 30 so that its straight edge 29 runs on the rocking support wheels 33 and 32; consequently, in whatever position the nut 23 may be, the inner edge line 29 of the quotient arm will intersect the centre of the pivot 31. The pivot is offset to give clearance for the floating movement of the quotient arm 12.

The lead nut carriage 19 carries a bracket 35 in which two idle wheels 36 and 37 are mounted, and a jockey wheel 38 is pivotally mounted on the counterweight arm 27. A flexible wire or cord 39 is fixed at its end in an adjustable fastening 40, and this wire or cord is reeved over the wheel 37, around the wheel 38, and under the wheel 36; thence it is carried upwardly over a fair-lead wheel 41 and is wound over a snail cam 42 which is fixed on the spindle 46 of an indicator dial 43. 44 is a weight hung by a flexible cord 39 from a pulley on the spindle of the dial 43 in such a way so as to cause that spindle to turn in the direction indicated by the arrow and thus to hold the flexible wire or cord 39 always under tension. The extension arm 27 might be omitted and the jockey wheel 38 then carried on an extension of the quotient arm 12 below its pivot 25.

The cord 39 may be brought over a cylindrical drum on the dial spindle, but when it is required to differently space the figures on the dial, or to space the low ratios wider apart to exhibit them more clearly than the higher ratios or vice versa, the snail cam arrangement 42 is a convenient transmission device. It will be understood that when the ratio is high, which will happen when the grand total lead screw 10 has made a large number of rotations and the individual total lead screw 11 has made very few rotations, the ratio of the one movement to the other will be high; whereas conversely, when the conditions are the reverse, and equality is reached or exceeded in the ratio to be displayed, the ratio will fall towards zero. When the ratio is say 40 or 50 : 1, a close reading may not be necessary, particularly for totalizator apparatus, but when the odds shown are short, approaching equality or going below it, a closer reading may be very desirable. The cam arrangement 42 permits of the indicator dial 43 being moved through a greater angle on one part of the scale to provide for this desirable condition.

Fig. 4 shows the position of the quotient arm 12 with its bearing edge 29 exactly parallel with the inner side of the dividend lead screw 10, which is at the zero position, and with the individual divisor lead screw 11 also at zero position; the ratio at this point will be zero or infinity. As both lead screws 10 and 11 turn, the carriages 19 and 23 move along them and the quotient arm 12 comes to an angular position; the zero or starting position is shown in Fig. 4 and an intermediate position is shown in Fig. 1. When the parts are in the Fig. 4 (zero) position, the dial 43 indicates infinity or zero; as the quotient arm 12 assumes an angular position the counterbalance arm 27 tilts and slacks away the flexible cord 39; this cord is then wound over the cam 42 as the hand of the dial 43 is rotated by the weight 44 or by any other drive arrangement which may be substituted for the weight, but, as before described, when the cam 42 is not used, the cord 39 is wound over a drum on the spindle of the dial 43. The ratio to be indicated is found by the angular tilt of the quotient arm 12, this angular tilt depending upon the relative movements of the carriages 19 and 23 respectively as they move along the lead screws 10 and 11 in different directions.

At the infinity or starting position the centre of the pivot 25 will be in alignment with the centre of the carriage pivot 31 and the contact faces of the riding rollers 32—33 will be in alignment. The quotient arm 12 then standing vertically, with its pivot level with the lateral bearing, will be in unstable equilibrium. Provision is, therefore, made for affording a temporary support for the quotient arm until the carriage 19 has moved some distance and has thus provided a normal supoprt for the arm, as seen in Fig. 1; this temporary support consists of a bearer roller 51 which is slidable along a guide bar 52 and is attached at 53 to a continuous belt 54. At the outer end this belt runs over a jockey wheel 55 and at the inner end over a pulley 56. A counterweight 60 hanging on a flexible cord 61 runs over a drum 62 attached to the pulley 55 or belted to the pulley 56. The cord 61 is connected to the arm 57. This arm is fixed on the spindle of a device 58 of the spring and dash pot door closer type which is arranged to pull slowly on the cord 61 and through the drum 62 to rotate the pulley 55 in the direction indicated by the arrow and thus to retire the roller 51 and leave the quotient arm 12 free to bear against the roller supports 32—33 on the lead screw carriage 23. The finger or roller 51 is set by reversely winding the belt 54 by turning a hand crank 63 until the quotient arm 12 is erect, and a stop piece 90 on the arm 57 is engaged in the check 91 in a trigger 92 which rocks on a pivot 93. The other end of this trigger 92 is in the path of a striker 94 on the lead nut carriage 19. When the nut 20 in the carriage 19 is lifted to top or zero position (see Fig. 4), the cap being then open, the striker 94 passes the trigger, but in the descent of the carriage 19 the striker 94 trips the trigger, and thus liberating the spring moved arm 57 to procure movement of the belt 54, whereby the roller 51 is retired to leave the quotient arm free to tilt about its pivot 25.

When the lead screws 10 and 11 commence rotation, the carriages 19 and 23 will move away from the zero position, and the arm 12 will move down, but the quotient arm 12 will for the time being remain in the vertical position. Consequently, there will be no movement displayed on the dial 43; but after the rotation of the lead screw 10 has progressed very slightly, the tappet 94 will strike down the trigger 92 and release the pull arm 57. The support roller 51 will then be run down the guide 52 by the movement of the belt 54, and the quotient arm 12 will then bear against the carrier wheels 32—33 on the carriage 23 and the quotient arm will tilt accordingly, slacking away the cord 39 and thus effecting rotation of the hand of the dial 43. The weight 60 tensions the cord 61.

The shaft 70 extends through all the mechanisms in the installation, but the trigger and pull-off gear (Fig. 7) is fitted only on one of these mechanisms; it is not necessary to fit it on more than one of them as all the major lead screws 10 in the assembly rotate together and must all start at zero position. When the resetting crank 63 is operated all the checks 51 are reset at zero position (see Figs. 4 and 7) simultaneously.

The sought-for ratio which is displayed on the dial 43 is obtained by translation of the angular movement of the quotient arm; this angular movement depends upon the relative movement of the carriages 19 and 23 on their respective lead screws. As these lead screws are rotated to move their respective nuts proportionately to the registrations on the grand total counter and on a horse total counter of a totalizator (or corresponding elements in other installations) subject to any deduction effected by the action of intermediate change gear, the angular position of the quotient arm 12 at any particular moment will correspond with the desired ratio and the dial 43 will at all times display the ratio in simple figures. If the lead screws 10 and 11 are set in relation to each other at any other angle than a right angle there will be a corresponding difference in the angle taken up by the quotient arm 12 in any particular circumstances, and this difference may be compensated by appropriately altering the proportions of the snail cam 42 or the diameter of the drum over which the flexible cord 39 runs, and at the same time, by appropriately correcting the calibrations in the indicator dial.

It is important that the inner edge 29 of the quotient arm 12 shall be in alignment with the axis of the pivot 25 and that it shall also pass through the centre of pivot 31 in all circumstances; otherwise a correct angular movement will not be obtained in the quotient arm and the indicator would not display the ratio with precise correctness. The rocking carriage device 32—33 shown in Fig. 1 makes the necessary mechanical provision for ensuring the correct angular positioning of the quotient arm in correspondence with the relative positions of the carriages 19 and 23 on their respective lead screws 10 and 11.

The odds proportion or ratio is determined solely by the angular position of the quotient arm irrespectively of the range of movement of the lead screw nuts on the lead screws. Thus, for instance, if a ratio 1:1 is shown on the indicator when the quotient arm stands at 45°, it is of no account whether the lead screw nuts are close up to or far distant from the crossing position of the two lead screws, for so long as the proportion between the total figures is the same it is of no consequence whether these figures be large or small and the same angle will result. Therefore, throughout the whole range of operation of the device a uniform condition prevails, that is to say, the angular position of the quotient arm determines the ratio of the two quantities to be compared, and his angular position is translated onto a dial or other indicator, the movement of which can be readily observed.

It is obviously not necessary that the angular movement of the quotient arm 12 should be communicated to the indicator dial 43 by the particular pull cord arrangement which has been described. Instead of this pull cord arrangement the quotient arm 12' (Fig. 5) may be provided with a tail extension piece 70 having a roller 71 on the end of it; this roller operates against a bar 72 which is supported on parallel links 73 and 74 and is held back by bridle springs 75—76 and is connected by a flexible line 77 to a drum 78 on an indicator dial 79, this dial being turned by a weight 80 or otherwise. In this case, as the quotient arm 12' tilts, the wheel 71 presses outward, tensioning the springs 75 and 76 and moving the bar 72 outward, thus pulling the line 77 and rotating the dial 79. In another alternative transmission device (Fig. 6) the quotient arm $12^2$ has associated with it a parallel motion device 82 identical with that commonly used on draftsman's drawing tables. The butt 83 of this device is fixed to the quotient arm $12^2$, across the pivot 25, so that the tilt of the quotient arm is transmitted through the parallel motion linkages in the well-known way and is utilized to turn a roller 84 over which a cord 85 is wound; this cord corresponds with the cord 77 and is carried over a drum on a dial spindle in the same way, and the rotation of the wheel 84 obediently to the alteration in angular tilt in the quotient arm $12^2$ is thus transmitted to a dial or other indicator.

As far as this description of the apparatus has gone, it provides only for the movement of an indicator dial 43 or 79 which would allow the straight-out ratio between two numbers which would represent in a totalizator the odds that an investor would expect to receive if he invested his money as a "straight-out" bet on the particular horse represented by the indicator under his observation.

When the device is to operate to indicate a plurality of ratios, as for place betting, the change gear train (Fig. 2) is moved in the well known manner to bring the appropriate wheels into motion for the purpose of altering the rotations of the major lead screw 10 in relation to the driving shaft 100 which comes from the grand total register. If, for instance, place betting is carried on on the basis of 60% to the 1st horse, 20% to the 2nd, and 20% to the 3rd, the change wheels are proportioned accordingly to bring out on the dial the ratio in respect of the first horse. The betting public will know from the rule that there will be paid in respect of the 2nd horse and the 3rd horse one third of the dividend indicated for the 1st horse. With such an arrangement, which will be readily understood by the public, it becomes unnecessary to load the dial or other indicator with a series of figures, one range of figures being enough for all practical purposes. The change in the gear train can be effected by an instant movement to set the apparatus according to the ratios it is desired to show. It is necessary only to provide one set of change gear for the whole installation, as through this gearing the number of rotations made by the major lead screw 10 in proportion to the number of rotations made in the same time by the grand total register spindle 100 is so controlled that the correct ratio for the particular circumstances is always found from the angular position of the quotient arm 12.

It is necessary that there should be certainty in the setting up of all the devices in the installation at the zero position, as otherwise a false indication might be given on one or more of the dials. In order therefore to ensure certainty in this regard an electrical check is provided upon the lead screw 10. A metal contact 101 is carried on an insulating sleeve on the lead screw 10 and a brush 102 co-acts with this contact when the contact is in one certain position, this position being that on which all the grand total lead screws hold the carriages 19 exactly at zero position. In order to assure that the carriage 19 is brought to the top thread, another contact 103 in series with the contact 101 is provided; this contact 103 is only closed when it is engaged by a contact 103ˣ on the top end of the nut carriage 19. Simultaneously a contact 106ˣ also in series with the contacts 101 and 103 is provided to co-act with a contact 106 on the lead nut carriage 23. The series circuit goes through a signal lamp or other indicator 105, or may be to a check device of any other kind for preventing the operation of the mechanism until everything is in readiness for operation of the ratio indicators. All the contacts 101, 103, and 106 throughout the system are in series, and consequently if any one of them should be open, the signal or control device 105 will not be operated and the operation of mechanisms associated with the ratio indicating system cannot be commenced. The control means 105 for preventing commencement of operations is any form of electromagnetic lock or cut out which is adapted to hold the operating circuits of the associated mechanisms open until all the serial circuits 101, 103 and 106 in the ratio indicator system have been completed.

What we claim as our invention and desire to secure by Letters Patent is:—

1. Apparatus for the purposes set forth, comprising two lead screws rotatable in fixed bearings in angular relation to each other, a clamp nut carrier on each of said lead screws, a counterbalanced quotient arm pivotally mounted on one of said carriers and bearing against a support on the other of them, a jockey pulley on said arm, and a flexible line carried over fair lead pulleys on the carrier on which the arm is pivotally mounted and reeved over said jockey pulley and thence connected to an indicator, said indicator being adapted to display figures or other indicia in correspondence with the angular movement of the quotient arm resulting from the traverse of the carrier nuts along their respective lead screws.

2. In combination with apparatus according to claim 1, a trip device co-acting with a tappet on one of the carriers and operatively connected to a device adapted for temporarily supporting the quotient arm in such manner as to set up said temporary support when the apparatus is brought to the starting position and to free said support and liberate the quotient arm after movement of one of the carriers has progressed to a predetermined position on its lead screw.

3. Apparatus for the purposes set forth, comprising two lead screws rotatable in fixed bearings in angular relation to each other, a clamp nut carrier on each of said lead screws, a support, a counterbalanced quotient arm pivotally mounted on one of said carriers and bearing against said support, said support comprising a rocking member pivotally mounted on the other of said carriers, and two rollers mounted on said rocking member, one edge of said quotient arm bearing tangentially on said rollers and intersecting the axes of the pivot mounts of said rocking support and said arm, a jockey pulley on said arm, and a flexible line carried over fair lead pulleys on the carrier on which the arm is pivotally mounted and reeved over said jockey pulley and thence connected to an indicator, said indicator being adapted to display figures or other indicia in correspondence with the angular movement of the quotient arm resulting from the traverse of the carrier nuts along their respective lead screws.

4. Apparatus for the purposes set forth, comprising two lead screws rotatable in fixed bearings in angular relation to each other, a clamp nut carrier on each of said lead screws, a support, a counterbalanced quotient arm pivotally mounted on one of said carriers and bearing against said support, said support comprising a rocking member pivotally mounted on the other of said carriers, and two rollers mounted on said rocking member, one edge of said quotient arm bearing tangentially on said rollers and intersecting the axes of the pivot mountings of said rocking support and said arm, and means including a flexible line for communicating the movements of said arm to an indicator, said indicator being adapted to display figures or other indicia in correspondence with the angular movement of the quotient arm resulting from the traverse of the carrier nuts along their respective lead screws.

5. Apparatus according to claim 1 in which the quotient arm is pivotally mounted on one of the carriers and bears against a rocking support pivotally mounted on the other carrier, said rocking support adapted to offer a true bearing for the arm, thereby to ensure that the angular movement of the arm is in exact correspondence with the relative movements of the two carriers.

6. In apparatus according to claim 1, means for temporarily supporting the quotient arm in vertical position until a predetermined movement has taken place in the position of one of the carriers.

In testimony whereof we affix our signatures.

GEORGE ALFRED JULIUS.
AWDRY FRANCIS JULIUS.